US008746379B2

(12) United States Patent
Cantemir et al.

(10) Patent No.: US 8,746,379 B2
(45) Date of Patent: Jun. 10, 2014

(54) POWERTRAIN, VEHICLE AND METHODS

(71) Applicant: The Ohio State University Research Foundation, Columbus, OH (US)

(72) Inventors: Codrin-Gruie Cantemir, Columbus, OH (US); Gabriel G. Ursescu, Iasi (RO); Georgio Rizzoni, Columbus, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 0 days.

(21) Appl. No.: 14/044,708

(22) Filed: Oct. 2, 2013

(65) Prior Publication Data

US 2014/0034405 A1      Feb. 6, 2014

Related U.S. Application Data

(62) Division of application No. 12/445,333, filed as application No. PCT/US2007/021776 on Oct. 12, 2007, now Pat. No. 8,573,348.

(60) Provisional application No. 60/851,537, filed on Oct. 13, 2006.

(51) Int. Cl.
*B60K 17/354*      (2006.01)
*B60K 6/42*      (2007.10)
*B60K 6/387*      (2007.10)

(52) U.S. Cl.
CPC .. *B60K 6/42* (2013.01); *B60K 6/387* (2013.01)
USPC ........................... 180/65.245; 701/22; 701/70

(58) Field of Classification Search
CPC ................................. B60K 6/42; B60K 6/387
USPC .......................... 180/242, 243, 245, 246, 248, 180/65.1–65.7; 701/22, 70; 475/198
See application file for complete search history.

(56) References Cited

U.S. PATENT DOCUMENTS 5,285,866 A     2/1994    Ackroyd
6,691,809 B2 *   2/2004    Hata et al. ................. 180/65.225

(Continued)

FOREIGN PATENT DOCUMENTS

DE      1 580 064      9/1970
EP       1 018 451      7/2000

OTHER PUBLICATIONS

Cantmir, et al., *Concept Design of a New Generation Military Vehicle*, SPIE vol. 6201, 620113 (2006).

*Primary Examiner* — Tony Winner
*Assistant Examiner* — Jacob Knutson
(74) *Attorney, Agent, or Firm* — Fay Sharpe LLP

(57) ABSTRACT

A powertrain is adapted to drive ground-engaging elements disposed along longitudinally-opposing sides of a vehicle. The powertrain includes at least one engine, a first electric machine, a second electric machine, a third electric machine, a first differential mechanism and a second differential mechanism. The engine and first electric machine are operatively connected to the first and second differential mechanisms. The second electric machine is operatively connected to the first differential mechanism and the third electric machine is operatively connected to the second differential mechanism. The first and second differential mechanisms are each operatively connected to drivable engage one or more ground-engaging elements disposed on a different one of the longitudinally-opposing sides of the associated vehicle. A vehicle including such a powertrain as well as methods of using the same are also included.

7 Claims, 12 Drawing Sheets

(56) References Cited

U.S. PATENT DOCUMENTS

| | | | |
|---|---|---|---|
| 6,823,961 B2* | 11/2004 | Lamela et al. | 180/305 |
| 7,140,461 B2* | 11/2006 | Morrow | 180/65.245 |
| 7,395,889 B2* | 7/2008 | Sugiyama et al. | 180/65.285 |
| 2005/0060080 A1 | 3/2005 | Phillips et al. | |
| 2006/0135307 A1* | 6/2006 | Lim et al. | 475/198 |
| 2008/0004780 A1* | 1/2008 | Watanabe et al. | 701/54 |

* cited by examiner

POWERTRAIN, VEHICLE AND METHODS

This application is a divisional of application Ser. No. 12/445,333, which is the National Stage of International Application No. PCT/US2007/021776, filed Oct. 12, 2007, which claims the benefit of Provisional Application No. 60/851,537, filed Oct. 13, 2006, each of which is incorporated herein by reference in its entirety.

BACKGROUND

The subject matter of the present disclosure broadly relates to the art of vehicle powertrains and, more particularly, to an electrically-variable powertrain for an all-wheel drive vehicle. The subject matter finds particular application and use in conjunction with high-performance, all-terrain personnel transport vehicles, and will be described herein with particular reference thereto. However, it is to be appreciated that the subject matter of the present disclosure is also amenable to use in other applications and environments, such as in passenger vehicles, light-duty trucks, sport-utility vehicles and other transport vehicles, for example. Thus, it will be appreciated that any specific reference herein to use in association with high-performance, all-terrain personnel transport vehicles is merely exemplary.

It will be appreciated that the present disclosure includes numerous rotating components (e.g., rotors, crankshafts, axles, gears) that can rotate at different speeds, rotate in different directions, transmit or carry different torsional loads, and/or transmit or carry different horsepower loads, as either inputs or outputs. For ease of reading and understanding, terms such as rotational connection, rotational output, rotational power source, and the like, have been used to broadly refer to any such rotational, torsional or power condition. Additionally, as used herein with reference to certain elements, features, components, structures and/or actions (e.g., "first electric machine," "second electric machine," "first rotational connection" and "second rotational connection"), numerical ordinals merely denote different singles of a plurality and do not imply any order or sequence unless specifically defined by the claim language.

Personnel transport vehicles of a variety of types and kinds are known and commonly used. In many of such known vehicles, the powertrain and other mechanical components are centrally located on the vehicle typically toward the bottom side thereof. It is well recognized that components of greater size and/or mass are often less significantly damaged by projectiles and the discharge from explosive ordinance than are components of lesser size and/or mass. Though known arrangements provide some additional shielding against discharges from ordinance positioned underneath the vehicle, known arrangements do not utilize the mass of the powertrain components as supplemental shielding of the personnel compartment of the vehicle.

Additionally, known hybrid powertrains typically control the supply of motive power to the vehicle under an axle-by-axle type of operation. This is believed to be the case even when such a hybrid powertrain is used on an all-wheel drive vehicle. As such, as a vehicle is traveling on a succession of dry and icy surfaces, there is often only a small interval during which the axles are operating under different conditions from one another. As a vehicle is traveling along a partially snow-covered road, one side of the vehicle may be operating on dry pavement while the other side of the vehicle may be operating on snow and ice. Under such conditions, known hybrid powertrains are believed to provide less than optimal control of the vehicle.

Furthermore, known hybrid vehicles commonly operate in a manner that results in asymmetrical cornering of the vehicle. That is, these vehicles are believed to operate such that the front and rear wheels of the vehicle track along slightly different paths as the vehicle negotiates a turn or corner. In some circumstances, such operation may be undesirable because it could be possible for one wheel on one side of the vehicle to avoid hitting an object laying on the ground while the second wheel on that side of the vehicle might contact the object, such as during a cornering maneuver, for example.

Accordingly, it is believed desirable to develop an electrically-variable powertrain for an all-wheel drive vehicle as well as methods of operation that may overcome one or more of the foregoing and other disadvantages.

BRIEF DESCRIPTION

A vehicle in accordance with the present novel concept is provided that includes a vehicle structural assembly having a longitudinally-extending centerline with first and second vehicle structure portions extending along opposing sides of the centerline. A first plurality of ground-engaging elements is operatively disposed along the first vehicle structure portion on one of the opposing sides of the centerline. A second plurality of ground-engaging elements is operatively disposed along the second vehicle structure portion on the other of the opposing sides of the centerline. A vehicle powertrain drivably engages one or more ground-engaging elements of each of the first and second pluralities of ground-engaging elements. The vehicle powertrain includes at least one engine that includes an engine rotational connection. The vehicle powertrain also includes a first electric machine. The first electric machine includes a first EM rotational connection that is operatively connected to the engine rotational connection. The vehicle powertrain also includes second and third electric machines. The second electric machine includes a second EM rotational connection and the third electric machine includes a third EM rotational connection. The vehicle powertrain further includes first and second differentials. The first differential includes first, second and third DF rotational connections. The first DF rotational connection is operatively connected to the engine rotational connection and the first EM rotational connection. The second DF rotational connection is operatively connected to the second EM rotational connection. The third DF rotational connection is operatively connected to drivably engage the first plurality of ground-engaging elements on one opposing side of the centerline. The second differential includes fourth, fifth and sixth DF rotational connections. The fourth DF rotational connection is operatively connected to the engine rotational connection and the first EM rotational connection. The fifth DF rotational connection is operatively connected to the third EM rotational connection. The sixth DF rotational connection is operatively connected to drivably engage the second plurality of ground engaging elements on the other opposing side of the centerline.

A powertrain in accordance with the present novel concept that is adapted to drive associated ground-engaging elements disposed along longitudinally-opposing sides of an associated vehicle is provided that includes at least one engine having an engine rotational connection. A first electric machine includes a first EM rotational connection that is operatively connected to the engine rotational connection. A second electric machine includes a second EM rotational connection and a third electric machine includes a third EM rotational connection. A first differential mechanism includes first, second and third DF rotational connections. The first DF rotational connection is operatively connected to the engine rotational connection and the first EM rotational connection. The second DF rotational connection is operatively connected to the second EM rotational connection. The third DF rotational connection is operatively connected to drivably engage one or more of the associated ground-engaging elements disposed on one longitudinally-opposing side of the associated vehicle. A second differential mechanism includes fourth, fifth and sixth DF rotational connections. The fourth DF rotational connection is operatively connected to the engine rotational connection and the first EM rotational connection. The fifth DF rotational connection is operatively connected to the third EM rotational connection. The sixth DF rotational connection is operatively connected to drivably engage one or more associated ground-engaging elements disposed on the other longitudinally-opposing side of the associated vehicle.

A method of powering of vehicle in accordance with the present novel concept is provided that includes providing a vehicle structural assembly including a longitudinally-extending centerline and opposing vehicle structure sides. The method also includes providing first and second pluralities of ground-engaging elements with the first plurality of ground-engaging elements disposed along one opposing vehicle structure side and the second plurality of ground-engaging elements disposed along the other opposing vehicle structure side. The method also includes providing a vehicle powertrain including a first engine, a first electric machine, a second electric machine, a third electric machine, and first and second differentials. The method further includes transmitting rotational output from at least the first engine to the first and second differentials. The method also includes transmitting rotational output from at least one of the first electric machine and the second electric machine to the first differential and transmitting rotational output from at least one of the first electric machine and the third electric machine to be second differential. The method further includes transmitting rotational output from the first differential to the first plurality of ground-engaging elements to operatively drive one of the opposing vehicle structure sides and transmitting rotational output from the second differential to the second plurality of ground-engaging elements to operatively drive the other of the opposing vehicle structure sides.

A method of generating electrical power from a vehicle is provided that includes providing a vehicle structural assembly including a longitudinally-extending centerline and opposing vehicle structure sides. The method also includes providing first and second pluralities of ground-engaging elements with the first plurality of ground-engaging elements disposed along one of the opposing vehicle structure sides and the second plurality of ground-engaging elements disposed along the other of the opposing vehicle structure sides. The method further includes providing a vehicle powertrain that includes a first engine, a first electric machine, a second electric machine, a third electric machine, and first and second differentials. The method also includes rotationally affixing the first and second pluralities of ground-engaging members such that rotational output from the first and second differentials can be respectively transmitted to the second and third electric machines. The method further includes transmitting rotational output from at least the first engine to at least one of the first electric machine, the first differential and the second differential. The method also includes generating electrical power at at least one of the first, second and third electric machines in response to the rotational output from the first engine.

DETAILED DESCRIPTION

Turning now to the drawings wherein the showings are for the purpose of illustrating exemplary embodiments of the present novel concept and which are not intended as a limitation of the same, FIGS. 1, 3, 5 and 7 each illustrate a vehicle that includes a vehicle structural assembly, such as a vehicle body, frame or chassis, for example. The vehicles include longitudinally-spaced first or forward ends FND and second or rearward ends RND and are also shown as including a longitudinally-extending centerline CTL that generally defines opposing first and second sides SD1 and SD2 of the vehicle.

The vehicle structural assemblies can be supported on an unsprung mass that can include a plurality of ground-engaging elements, such as wheels or linked tracks, for example, that are supported along each of opposing sides SD1 and SD2 of the vehicle. The unsprung mass can also include one or more structural members or other components, such as support arms (not shown), for example, operatively connecting the plurality of ground-engaging elements to the vehicle structural assembly. It will be appreciated that the pluralities of ground-engaging elements (e.g., wheels or linked tracks) as well as the structural members or other components operatively connecting the pluralities of ground-engaging elements to the sprung mass of the vehicle (e.g., a vehicle structural assembly) can be of any suitable type, kind and/or configuration.

Figure 1:
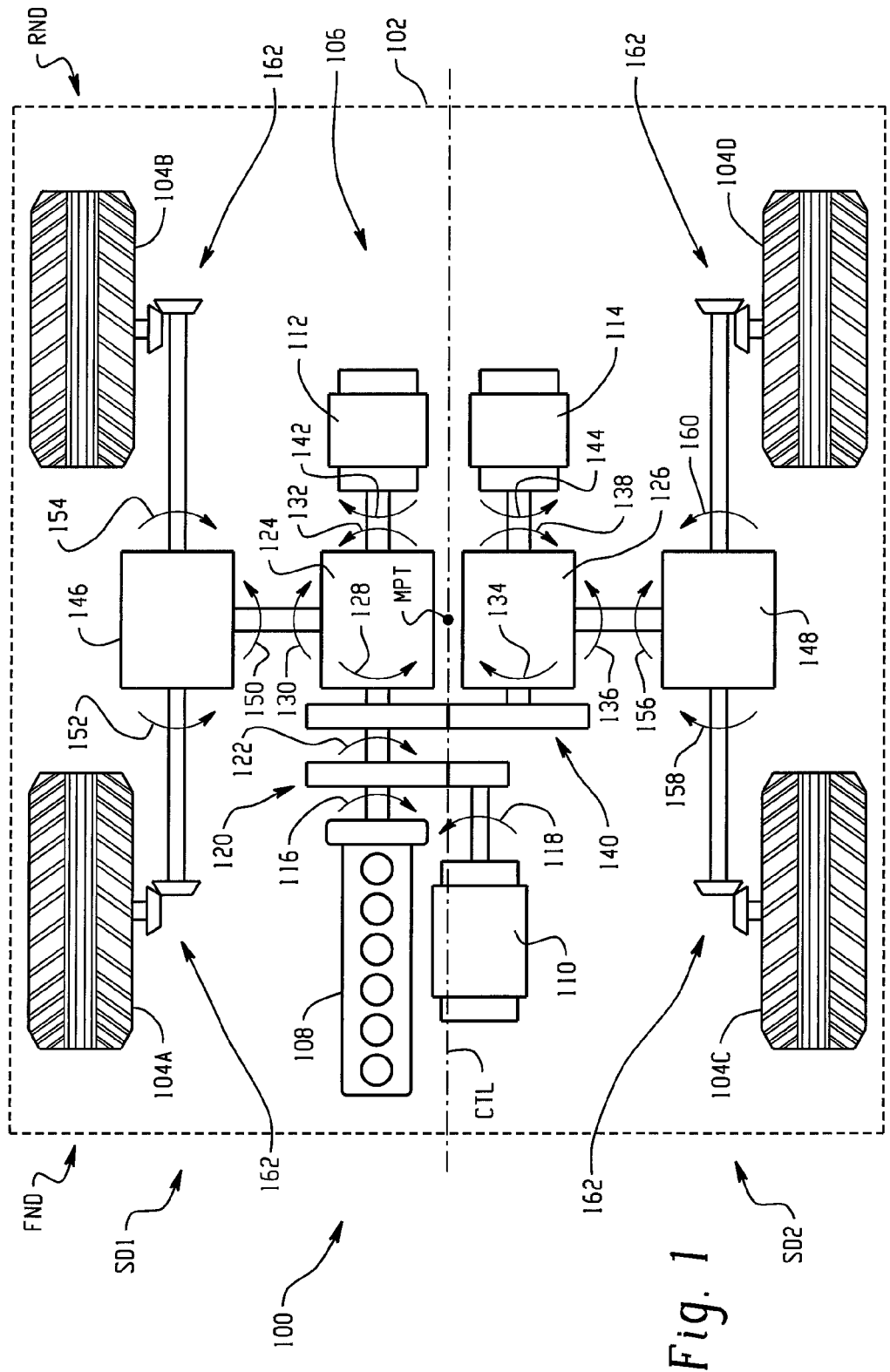
FIG. 1 is a schematic representation of one exemplary embodiment of a powertrain in accordance with the present novel concept shown operatively disposed on a vehicle.

Furthermore, the plurality of ground-engaging elements of the vehicles in each of FIGS. 1, 3, 5 and 7 is shown as including four ground-engaging elements with two of the ground-engaging elements disposed along each of the two opposing sides SD1 and SD2. However, it will be appreciated that any suitable number of ground-engaging elements could alternately be used. In the exemplary embodiments shown, the four ground-engaging elements are spaced from one another such that one ground-engaging element is disposed toward the forward and rearward corners of each of the opposing sides of the vehicle. Thus, the vehicle in FIG. 1 is also shown with a midpoint MPT disposed along centerline CTL approximately midway between the forward and rearward ground-engaging elements. It will be appreciated that the vehicles in FIGS. 3, 5 and 7 will have similar midpoints, though the same are not shown in the drawing figures.

With more specific reference to FIG. 1, a vehicle 100 includes a vehicle structural assembly 102 with a first plurality of ground-engaging elements, such as wheels 104A and 104B, for example, disposed along first side SD1 and a second plurality of ground-engaging elements, such as wheels 104C and 104D, for example, disposed along second side SD2. Vehicle 100 also includes a powertrain 106 that is supported on vehicle structural assembly 102 and is operatively connected to drivably engage the plurality of ground-engaging elements (e.g., wheels 104A-D).

Powertrain 106 includes an engine 108 that is supported on or along structural assembly 102, and can be of any suitable type, kind and/or configuration. For example, engine 108 could be an internal combustion engine having one or more reciprocating pistons or, alternately, could be a rotary internal combustion engine. Additionally, engine 108 can be operable on any type or kind of fuel, such as gasoline, diesel, hydrogen, ethanol, biodiesel, for example, or any other suitable fuels or combination of fuels. Furthermore, an engine operating on a different thermodynamic cycle could alternately be used, such as a sterling cycle engine, for example. In one embodiment, engine 108 is a multi-cylinder internal combustion engine having an output power within a range of from about 50 hp to about 1000 hp. Additionally, normally aspirated engines or, alternately, engines utilizing forced air induction (e.g., turbo-charging, super-charging) can be used.

Powertrain 106 also includes a first, second and third electric machines, which are indicated in FIG. 1 by reference numbers 110, 112 and 114, respectively. The first, second and third electric machines are supported on or along structural assembly 102 in a suitable manner. Additionally, the first, second and third electric machines can be of any suitable type, kind or construction, and can include any suitable performance characteristics or specifications. Furthermore, the first, second and third electric machines can be of the same or different size, speed and/or power output relative to one another. In one exemplary embodiment, the second and third electric machines are substantially similar to one another and have a nominal power output that is approximately half the nominal power output of the first electric machine. In another exemplary embodiment, the second and third electric machines can have a nominal power output that is approximately one-quarter of the nominal power output of the first electric machine.

Engine 108 includes an engine rotational connection 116 and can optionally include a clutch (not shown) for selectively disengaging the engine from rotational connection 116. First electric machine 110 includes a first EM rotational connection 118. In the exemplary embodiment shown, the engine and the first electric machine are supported on or along vehicle structural assembly 102 in approximately parallel relation such that engine rotational connection 116 and first EM rotational connection 118 are disposed adjacent one another. A first transmission 120 is operatively connected between engine rotational connection 116 and first EM rotational connection 118. In the exemplary embodiment shown, first transmission 120 is a fixed ratio transmission that is operable to maintain a ratio of angular velocities between the engine and the first electric machine. It will be appreciated that the ratio of the first transmission can be selected based upon the desired output and other performance characteristics of a given application and/or use of powertrain 106. Alternately, a variable ratio transmission could optionally be used. In either case, first transmission 120 includes a rotational connection 122 that transmits the resulting or combined rotational output from the engine and first electric machine.

Powertrain 106 also includes first and second differentials or differential mechanisms 124 and 126. First differential 124 includes three rotational connections, which are respectively referred to herein as first, second and third rotational connections 128, 130 and 132. Similarly, second differential includes three rotational connections, which are respectively referred to as fourth, fifth and sixth rotational connections 134, 136 and 138. In the embodiment shown in FIG. 1, the resulting output from the engine and the first electric machine is delivered from rotational connection 122 to first and second differentials 124 and 126. It will be appreciated that the transmission of the resulting rotational output to the first and second differentials can be achieved in any suitable manner. For example, a second transmission 140 that includes suitably sized transmission elements (e.g., gears) can be operatively connected between rotational connection 122 and the first and fourth rotational connections of the first and second differentials, respectively. In one exemplary embodiment, it may be desirable to transfer the resulting rotational output from the engine and the first electric machine equally between the first and second differentials. In such case, second transmission 140 can include two substantially identical gears that are operatively interconnected between rotational connection 122 and rotational connections 128 and 134. In practice first transmission 120 ad second transmission 140 can be located or otherwise disposed in a common housing (not shown).

Second electric machine 112 includes a rotational connection 142 and third electric machine 114 also includes a rotational connection 144. In the exemplary embodiment shown in FIG. 1, rotational connection 142 is operatively connected to rotational connection 132 of first differential 124 and rotational connection 144 is operatively connected to rotational connection 138 of second differential 126. As such, rotational output can be transferred between the first differential and the second electric motor as well as between the second differential and third electric motor.

In the exemplary embodiment shown in FIG. 1, powertrain 106 also includes third and fourth differentials or differential mechanisms 146 and 148, which are operatively connected for drivably engaging one or more of the plurality of ground-engaging elements of the vehicle. Third differential 146 includes three rotational connections, which are respectively indicated herein by reference numbers 150, 152 and 154. Similarly, fourth differential 148 includes three rotational connections, which are respectively indicated herein by reference numbers 156, 158 and 160. Rotational connection 130 of first differential 124 is operatively connected to rotational connection 150 of third differential 146. Additionally, rotational connection 136 of second differential 126 is operatively connected to rotational connection 156 of fourth differential 148.

Rotational output from third and fourth differentials 146 and 148 can be transferred to and/or from the ground-engaging elements (e.g., wheels 104A-D) in any suitable manner. For example, as shown in FIG. 1, the ground-engaging elements can include final transmissions 162 that are drivably connected to rotational connections 152, 154, 158 and 160 for transferring rotational output therefrom. It will be appreciated, however, that any other suitable configuration and/or arrangement could ultimately be used.

Figure 2:
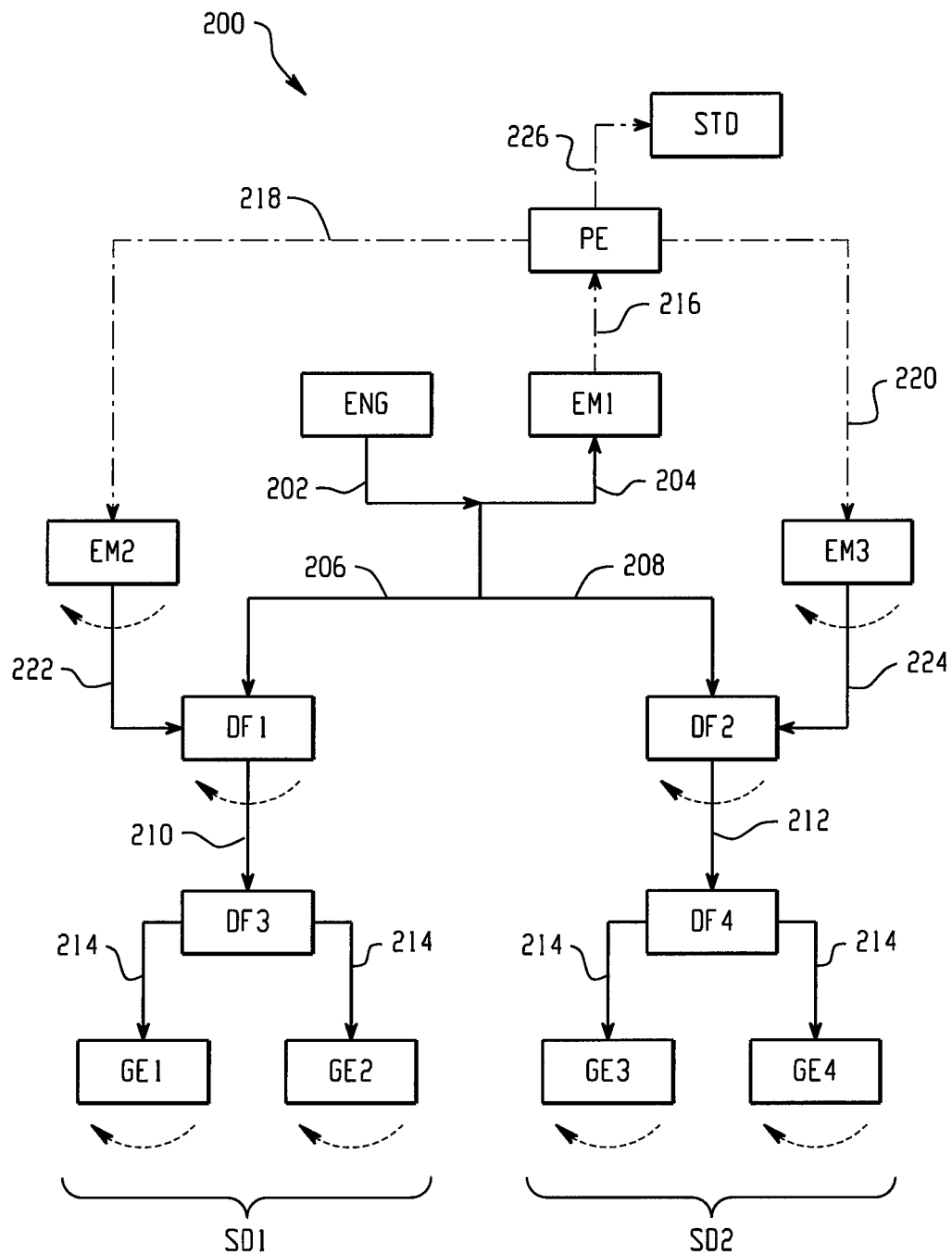
FIG. 2 illustrates one exemplary method of powering a vehicle in accordance with the present novel concept.

One advantage of using a powertrain such at that shown in FIG. 1 is that the powertrain provides the capability to substantially independently control the motive power delivered to each of the two different sides of the vehicle. One exemplary method 200 of powering a vehicle using a powertrain in accordance with the present novel concept, such as powertrain 106, for example, is shown in FIG. 2. Method 200 includes generating rotational output using engine ENG, as indicated by arrow 202. Method 200 also includes transmitting a first portion of the rotational output to first electric machine EM1, as indicated by arrow 204. The method also includes transmitting a second portion of the rotational output to differential mechanisms DF1 and DF2, as is respectively indicated by arrows 206 and 208. Method 200 further includes transmitting rotational output from first differential mechanism DF1 to third differential mechanism DF3, as is indicated by arrow 210. Method 200 also includes transmitting rotational output from second differential mechanism DF2 to fourth differential mechanism DF4, as indicated by arrow 212. Method 200 also includes transmitting rotational output from third and fourth differential mechanisms DF3 and DF4 to the respective ground-engaging elements, as indicated by arrows 214.

Method 200 further includes generating electrical power using the rotational output transmitted from along arrow 204 to first electric machine EM1 and transmitting the electrical power to suitable power electronics PE, as indicated by dashed arrow 216. Method 200 also includes selectively transmitting electrical power from power electronics PE to second and/or third electric machines EM2 and/or EM3, as indicated by dashed arrows 218 and 220, respectively. Method 200 further includes transmitting rotational output from second and third electric machines EM2 and EM3 respectively to first and second differential mechanisms DF1 and DF2, as indicated by arrows 222 and 224. This additional rotational output is transmitted to third and fourth differential mechanisms DF3 and DF4 for respective transfer to sides SD1 and SD2 of the vehicle. Due at least in part to the characteristics of this additional rotational output, this method of operation is well suited for higher speed operation of the vehicle. Method 200 ca further include selectively transferring electrical energy to and/or from storage device STD, as indicated by dashed arrow 226.

As indicated by directional arrows AR1 in FIG. 2, it will be appreciated that both sides SD1 and SD2 of the vehicle are being driven in the same direction during operation according to method 200. Another benefit of using a powertrain in accordance with the present novel concept, such as powertrain 106, for example, is that under certain operating conditions it is possible to cause the vehicle to swing around a vertical axis thereof (e.g., an axis through midpoint MPT) to thereby change (e.g., reverse) the direction of the vehicle. More specifically, by reversing the rotational direction of one of the second and third electric machines, the rotational direction of the rotational output from the corresponding differential mechanisms is likewise reversed. This results in the associated ground-engaging elements rotating in the opposite direction.

Figure 2A:
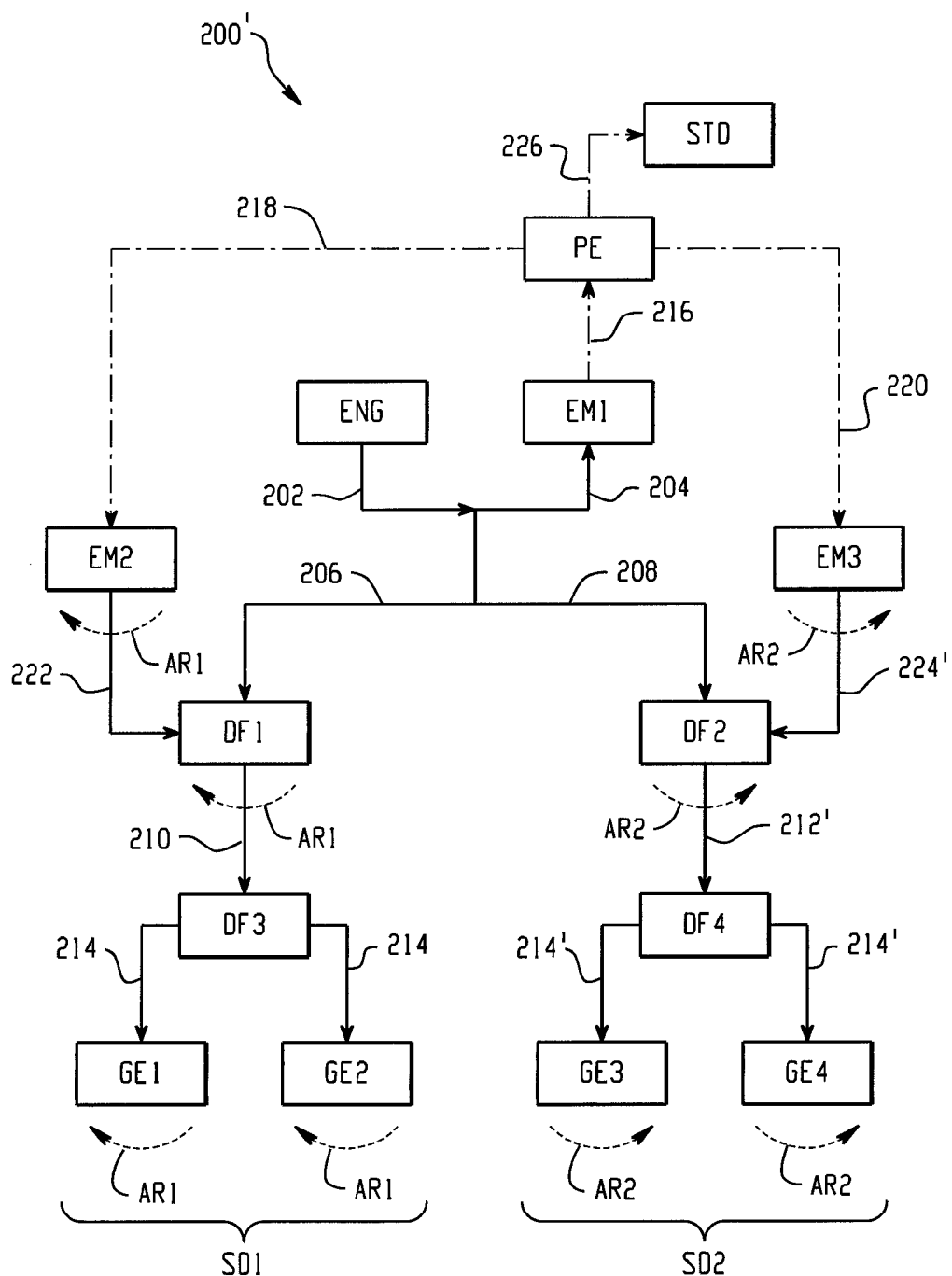
FIG. 2A illustrates another exemplary method of powering a vehicle in accordance with the present novel concept.

One exemplary method of powering a vehicle in such a manner is illustrated in FIG. 2A as method 200'. It will be appreciated that method 200' is substantially similar to method 200 discussed above with regard to FIG. 2. Method 200' differs from method 200 in that the rotational transmissions represented by arrows 212', 214' and 224' are in the opposing rotational direction. Thus, directional arrows AR1 that were associated with third electric machine EM3, second differential mechanism DF2 and ground-engaging elements GE3 and GE4 have been replaced by directional arrows AR2, indicating operation of these components in the opposing direction. As a result of ground-engaging elements GE1 and GE2 rotating in a first direction and ground-engaging elements GE3 and GE4 rotating in an opposing direction, the vehicle can pivot or otherwise swing about a vertical axis, such as an axis extending through midpoint MPT in FIG. 1, for example.

Figure 3:
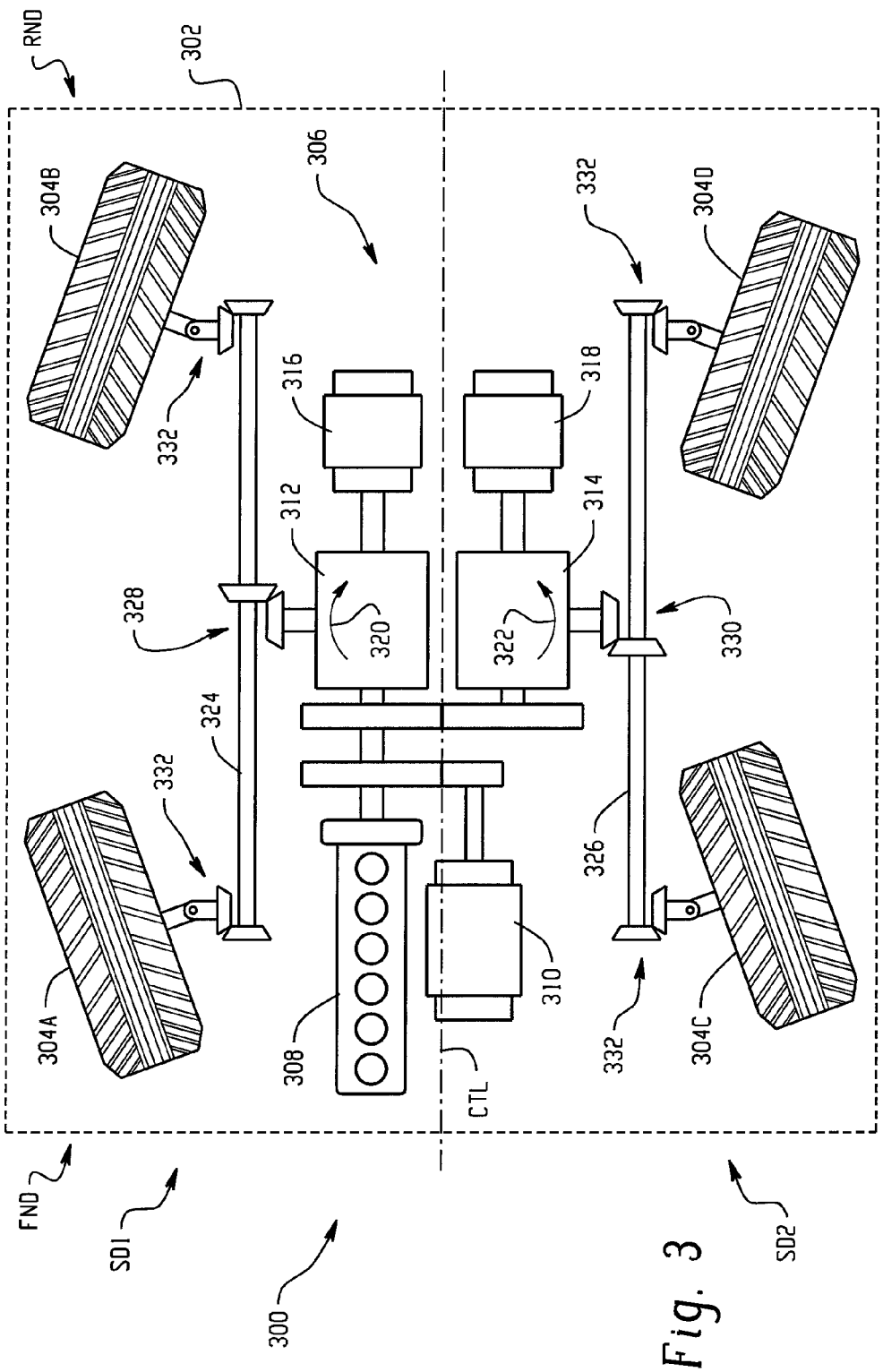
FIG. 3 is a schematic representation of another exemplary embodiment of a powertrain in accordance with the present novel concept shown operatively disposed on a vehicle.

Turning now to FIG. 3, another exemplary embodiment of a vehicle 300 in accordance with the present novel concept is shown therein that includes a vehicle structural assembly 302 with a first plurality of ground-engaging elements, such as wheels 304A and 304B, for example, disposed along first side SD1 and a second plurality of ground-engaging elements, such as wheels 304C and 304D, for example, disposed along second side SD2. Vehicle 300 also includes a powertrain 306 that is supported on vehicle structural assembly 302 and is operatively connected to drivably engage the first and second pluralities of ground-engaging elements (e.g., wheels 304A-D).

Powertrain 306 is shown in FIG. 3 as including an engine 308, a first electric machine 310, a second electric machine 312, a third electric machine 314 as well as first and second differentials 316 and 318, respectively. It will be appreciated that powertrain 306 is substantially similar to powertrain 106 shown in and discussed with regard to FIG. 1. As such, the features and elements relating to the rotational interconnections thereof are not repeated here.

Vehicle 300 differs from vehicle 100 in that vehicle 300 is equipped with an all-wheel steering system (not shown) that permits ground-engaging elements on the same side of the vehicle to be steered at the same angle. A central tire inflation system (not shown) or other similar arrangement can optionally be included to assist in maintaining a common rolling radius, if pneumatic wheels are used as ground-engaging elements. Accordingly, the speed of both of the wheels or other ground-engaging elements on a given side of the vehicle will be the approximately equal. Thus, third and fourth differentials 146 and 148, which were utilized in FIG. 1 to permit ground-engaging elements on a given side of the vehicle to have different speeds, have been eliminated from powertrain 306. As such, first and second differentials 316 and 318 are operatively connected to drivably engage the plurality of ground-engaging elements on respective sides of the vehicle.

First and second differentials 316 and 318 respectively include three rotational connections, as discussed above with regard to differentials 124 and 126. For purposes of the present discussion, only one rotational connection of each of first and second differentials 316 and 318 is identified in FIG. 3, which rotational connections are identified by reference numbers 320 and 322. It will be appreciated that first and second differentials 316 and 318 can drivably engage the plurality of ground-engaging elements in any suitable manner. For example, drive shafts 324 and 326 can be disposed along opposing sides of the vehicle with intermediate transmissions 328 and 330, respectively, operatively engaging rotational connections 320 and 322 of the first and second differentials. The drive shafts can then be operatively connected to the ground-engaging elements and any suitable manner, such as by using final transmissions 332, for example.

Figure 4:
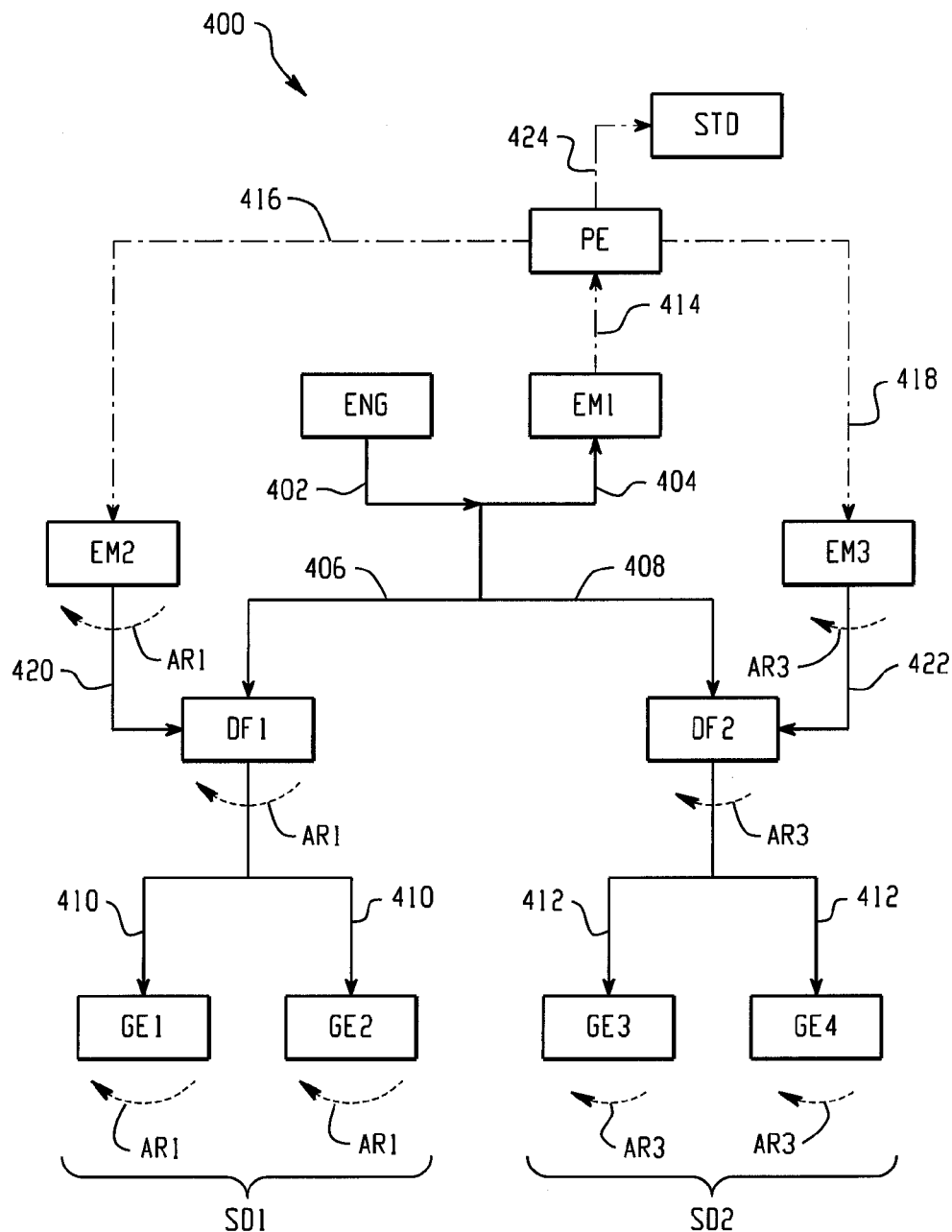
FIG. 4 illustrates still another exemplary method of powering a vehicle in accordance with the present novel concept.

Another exemplary method 400 of powering a vehicle using a powertrain in accordance with the present novel concept, such as powertrain 306, for example, is shown in FIG. 4.

Method 400 includes generating rotational output using engine ENG, as indicated by arrow 402. Method 400 also includes transmitting a first portion of the rotational output to first electric machine EM1, as indicated by arrow 404. The method also includes transmitting a second portion of the rotational output to differential mechanisms DF1 and DF2, as is respectively indicated by arrows 406 and 408. Method 400 further includes transmitting rotational output from first differential mechanism DF1 to ground-engaging elements GE1 and GE2 on or along side SD1, as is indicated by arrows 410. Method 400 also includes transmitting rotational output from second differential mechanism DF2 to ground-engaging elements GE3 and GE4 on or along side SD2, as indicated by arrow 412.

Method 400 further includes generating electrical power using the rotational output transmitted from along arrow 404 to first electric machine EM1 and transmitting the electrical power to suitable power electronics PE, as indicated by dashed arrow 414. Method 400 also includes selectively transmitting electrical power from power electronics PE to second and/or third electric machines EM2 and/or EM3, as indicated by dashed arrows 416 and 418, respectively. Method 400 further includes transmitting rotational output from second and third electric machines EM2 and EM3 respectively to first and second differential mechanisms DF1 and DF2, as indicated by arrows 420 and 422. This additional rotational output is transmitted from the differential mechanisms to the ground-engaging elements along respective sides SD1 and SD2 of the vehicle. Furthermore, method 400 can optionally include selectively transferring electrical energy to and/or from storage device STD, as indicated by dashed arrow 424.

In use on a vehicle that includes an all-wheel steering function, such as vehicle 300, for example, method 400 can operate to selectively vary the rotational output from one of the second and third electric machines. This, in turn, varies the rotational output at the corresponding ground-engaging elements associated with that side of the vehicle, which permits the more effective use of the all-wheel steering function without the use of additional differentials mechanisms, such as third and fourth differentials 146 and 148 in FIG. 1, for example. As shown in FIG. 4, second electric machine EM2 is operating at a greater speed than third electric machine EM3. Accordingly, directional arrows AR1 associated with the second electric machine and side SD1 are shown as being of greater length than directional arrows AR3, which are associated with third electric machine and side SD2.

Figure 5:
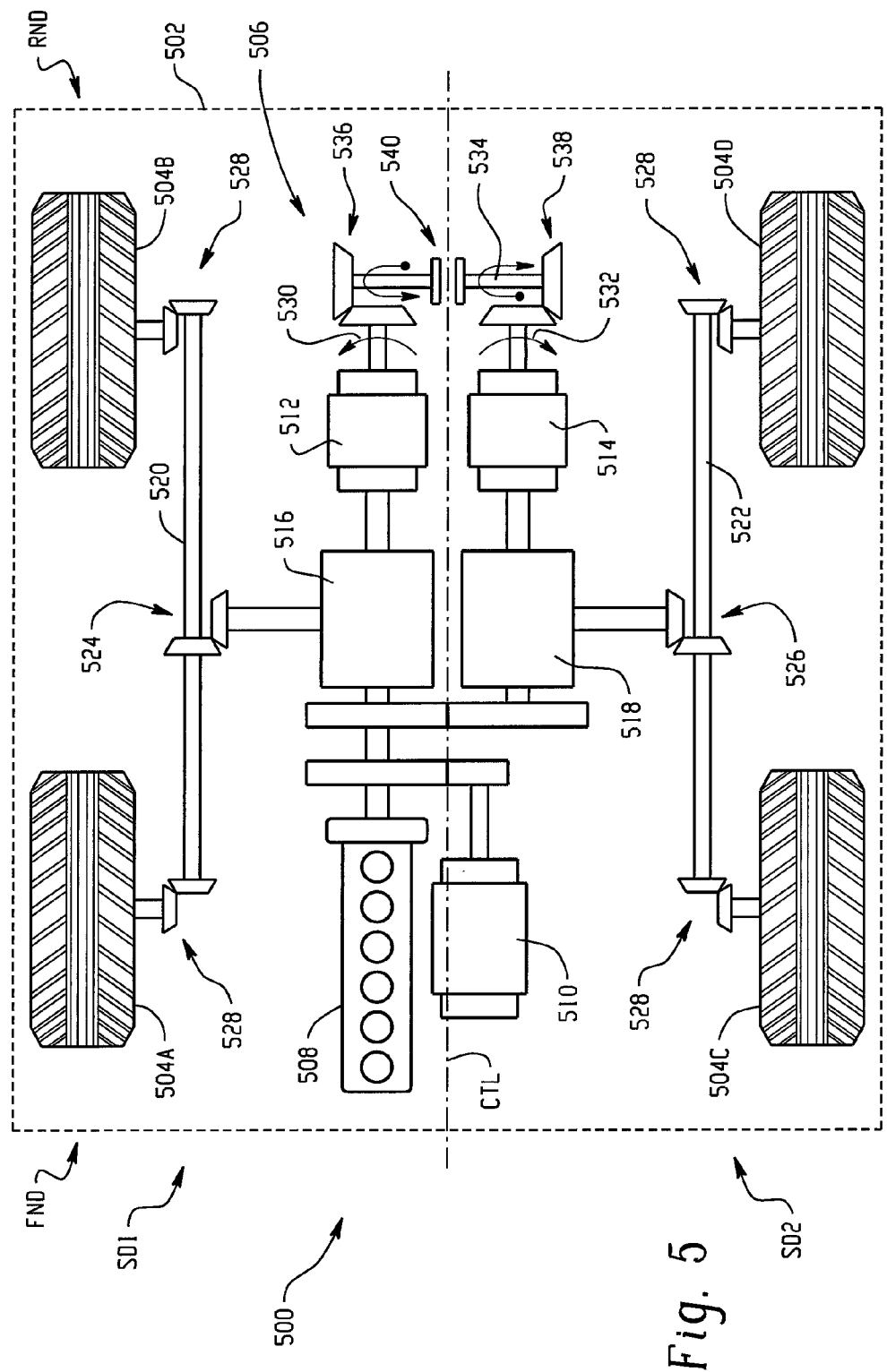
FIG. 5 is a schematic representation of still another exemplary embodiment of a powertrain in accordance with the present novel concept shown operatively disposed on a vehicle.

Turning, now, to FIG. 5, a further exemplary embodiment of a vehicle 500 in accordance with the present novel concept is shown that includes a vehicle structural assembly 502 with a first plurality of ground-engaging elements, such as wheels 504A and 504B, for example, disposed along first side SD1 and a second plurality of ground-engaging elements, such as wheels 504C and 504D, for example, disposed along second side SD2. Vehicle 500 also includes a powertrain 506 that is supported on vehicle structural assembly 502 and is operatively connected to drivably engage the first and second pluralities of ground-engaging elements (e.g., wheels 504A-D).

Powertrain 506 is shown in FIG. 5 as including an engine 508, a first electric machine 510, a second electric machine 512, a third electric machine 514, a first differential 516 and a second differential 518 as well as driveshafts 520 and 522, intermediate transmissions 524 and 526, and final transmissions 528. As such, it will be appreciated that powertrain 506 is substantially similar to powertrain 306 shown in and discussed with regard to FIG. 3. Accordingly, the features and elements related to the operation and rotational interconnections thereof are not repeated here.

Powertrain 506 differs from powertrains 106 and 306 discussed above in that second and third electric machines 512 and 514 are capable of being mechanically interconnected to provide additional modes of operation and/or performance characteristics. It will be appreciated that the second and third electric machines can be selectively mechanically interconnected in any suitable manner.

In the exemplary embodiment shown in FIG. 5, second electric machine 512 includes a first rotational connection (not numbered) operatively connected to first differential 516 and a second rotational connection 530 generally opposite the first rotational connection. Similarly, third electric machine 514 includes a second rotational connection 532 disposed generally opposite the first rotational connection (not numbered), which first rotational connection is operatively connected to second differential 518. Powertrain 506 also includes a differential shaft 534 that operatively interconnects second rotational connections 530 and 532. Again, it will be appreciated that such interconnections can be of any suitable type, kind and/or configuration. For example, fixed ratio transmissions 536 and 538 can be included between the differential shaft and the second rotational connections of the second and third electric machines, respectively. Additionally, one or more clutches 540 (or other suitable devices) can be provided along differential shaft 534 or otherwise operatively connected between the second rotational connections of the second and third electric machines.

Clutch 540 provides the capability for the second rotational connections to be selectively rotatable relative to one another, which permits the powertrain to employ several different modes of operation. As one example, permitting relative rotation of the second rotational connections of the second and third electric machines provides side-to-side mechanical differential action for accommodating different speeds of the two different sides of a vehicle, such as might be experienced when the vehicle is turning or cornering, for example. As another example, the second and third electric machines can be used to add rotational power to or subtract rotational power from one or both of the sides of the vehicle to provide increased directional control of the vehicle (i.e., increased steering capability). As a further example, utilizing the differential shaft and clutch to interconnect the second rotational connections of the second and third electric machines can result in a reaction torque being generated between the second and third electric machines that permits the engine to provide motive force to the vehicle without the use of any of the first, second or third electric machines. As still another example, the second and third electric machines can be coupled together by way of the differential shaft such that reaction torque from one differential can be transmitted to both of the second and third electric machines, which can permit additional electrical power to be generated thereby.

Figure 6:
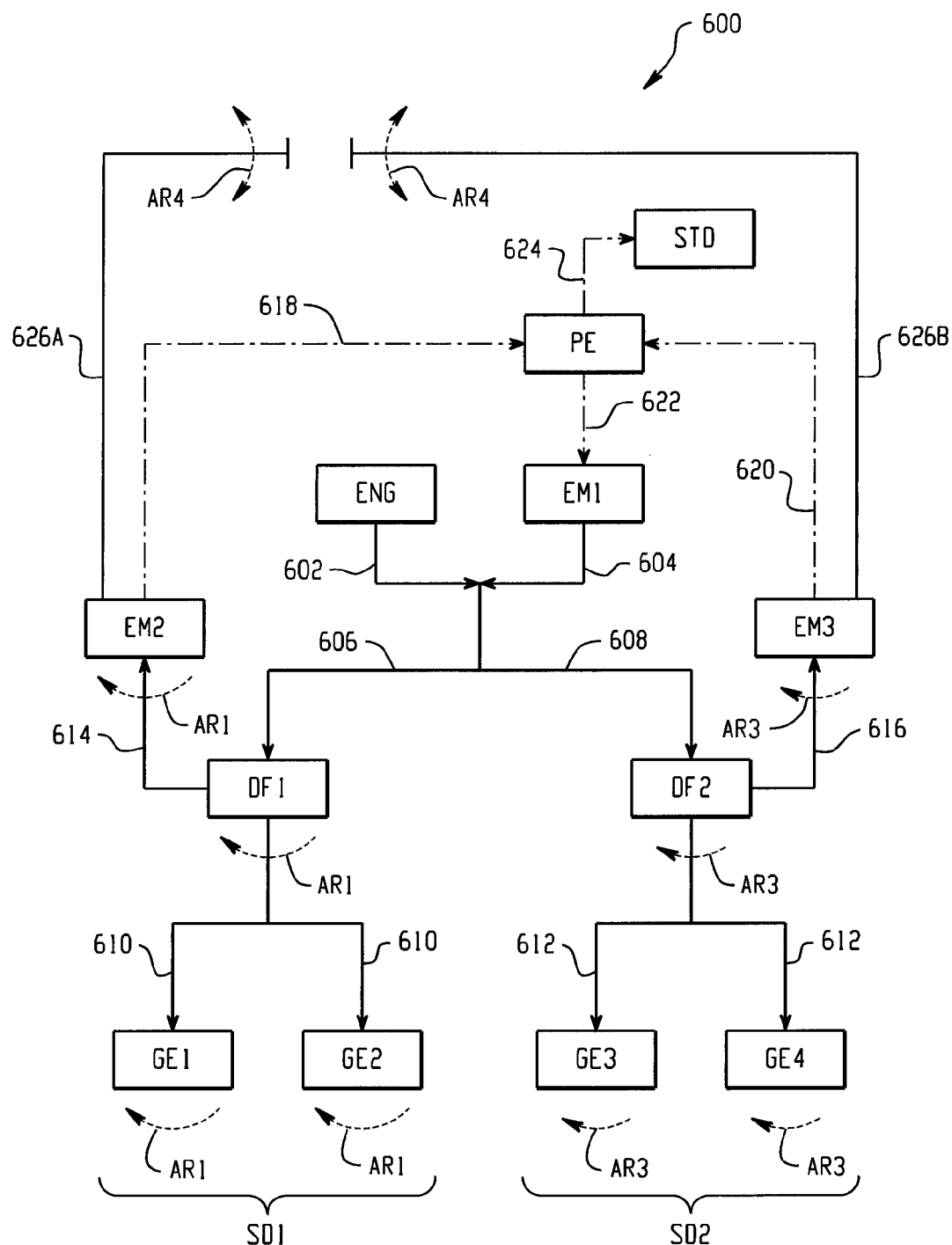
FIG. 6 illustrates yet another exemplary method of powering a vehicle in accordance with the present novel concept.

A further exemplary method 600 of powering a vehicle using a powertrain in accordance with the present novel concept, such as powertrain 506, for example, is shown in FIG. 6. Method 600 includes generating rotational output using engine ENG, as indicated by arrow 602. Method 600 also includes generating rotational output using first electric machine EM1, as indicated by arrow 604. The method also includes transmitting the rotational output from engine ENG and first electric machine EM1 to differential mechanisms DF1 and DF2, as is respectively indicated by arrows 606 and 608. Method 600 further includes delivering a first portion of the rotational output from first differential mechanism DF1 to ground-engaging elements GE1 and GE2 on or along side SD1, as is indicated by arrows 610. Method 600 also includes delivering a first portion of the rotational output from second differential mechanism DF2 to ground-engaging elements GE3 and GE4 on or along side SD2, as indicated by arrow 612.

Method 600 further includes delivering a second portion of the rotational output from first differential mechanism DF1 to second electric machine EM2 and delivering a second portion of the rotational output from second differential mechanism DF2 to third electric machine EM3, as is respectively indicated by arrows 614 and 616. Method 600 also includes generating electrical power using electric machines EM2 and EM3 from the rotational output delivered thereto from along arrows 614 and 616, respectively, and transmitting the electrical power to suitable power electronics PE, as indicated by dashed arrows 618 and 620. Method 600 includes selectively transmitting electrical power from power electronics PE to first electric machine EM1, as indicated by dashed arrow 622, which electrical power can be used to generate the rotational output indicated by arrow 604. Furthermore, method 600 can optionally include selectively transferring electrical energy to and/or from storage device STD, as indicated by dashed arrow 624.

Method 600 in FIG. 6 illustrates operation of a vehicle in a mode that is well suited for relatively low vehicle speeds. At such relatively low speeds, the torque output capacity of first electric motor EM1 can be utilized, such as to accelerate the vehicle or for use over rough terrain, for example. During such operation, the second and third electric machines are operatively disconnected from one another, as indicated by arrows 626A and 626B, such that first and second electric machines EM2 and EM3 can rotate independently of one another, as indicated by directional arrows AR4. According, sides SD1 and SD2 of the vehicle can operate at different speeds, as indicated by directional arrows AR1 and AR3.

Figure 6A:
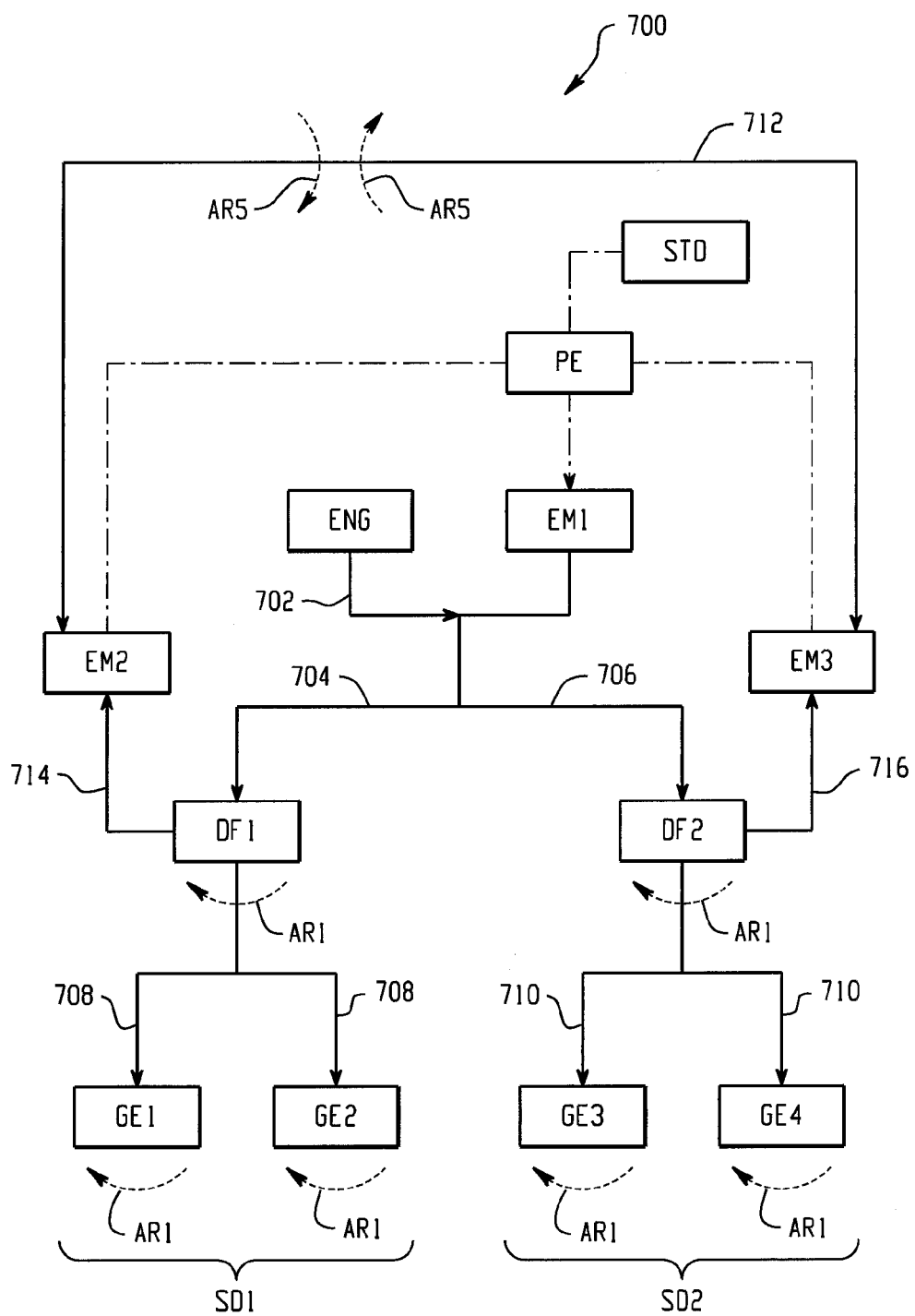
FIG. 6A illustrates a further exemplary method of powering a vehicle in accordance with the present novel concept.

Still a further exemplary method 700 of powering a vehicle using a powertrain in accordance with the present novel concept, such as powertrain 506, for example, is shown in FIG. 6A. Method 700 includes generating rotational output using engine ENG, as indicated by arrow 702. Method 700 differs from method 600, however, in that method 700 permits motive power to be provided to the vehicle without the use of the first, second or third electric machines. Method 700 also include delivering substantially all of the rotational output from engine ENG to at least one of differential mechanisms DF1 and DF2, as is respectively indicated by arrows 704 and 706. Method 700 can further include delivering substantially all of the rotational output from first differential mechanism DF1 to at least one of ground-engaging elements GE1 and GE2 on or along side SD1, as is indicated by arrows 708. Method 700 can also optionally include delivering substantially all of the rotational output from second differential mechanism DF2 to one or more of ground-engaging elements GE3 and GE4 on or along side SD2, as indicated by arrow 710.

In FIG. 6A, method 700 indicates that second and third electric machines are operatively connected to one another, as indicated by arrow 712. As such, rotational output (i.e., reaction torque) from first and second differentials DF1 and DF2 is respectively reacted to the second and third electric machines, as indicated by arrows 714 and 716. However, because second and third electric machines EM2 and EM3 are operatively coupled together, no substantial rotational motion occurs between the second and third electric machines, as indicated by counter-rotating directional arrows AR5. Even without the operation of the first, second and third electric machines, however, the vehicle is capable of operation under engine power, as indicated by directional arrows AR1.

Figure 6B:
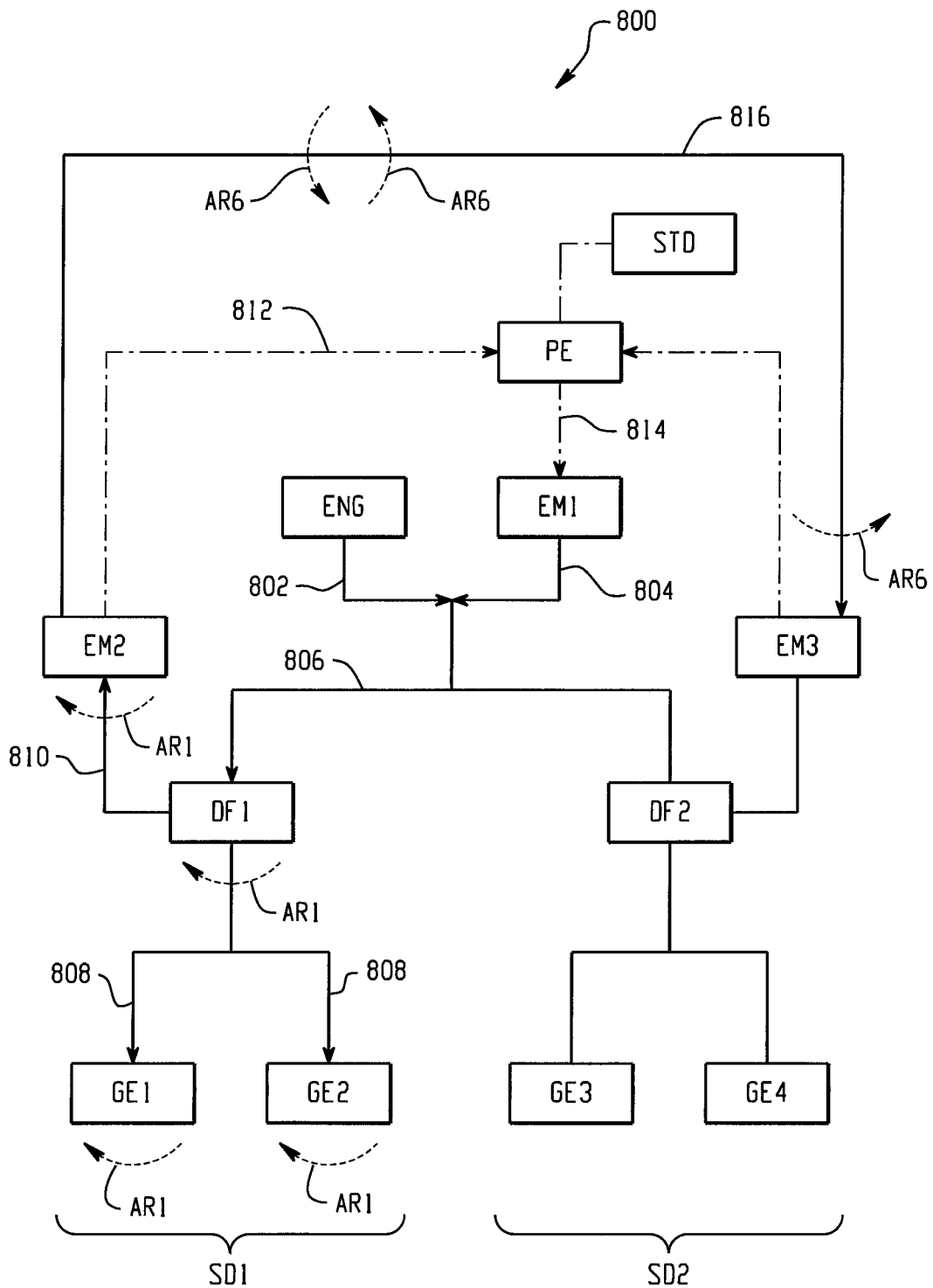
FIG. 6B illustrates still a further exemplary method of powering a vehicle in accordance with the present novel concept

Another exemplary method 800 of powering a vehicle using a powertrain in accordance with the present novel concept, such as powertrain 506, for example, is shown in FIG. 6B. Method 800 includes generating rotational output using engine ENG, as indicated by arrow 802 and generating rotational output using first electric machine EM1, as indicated by arrow 804. The method also includes delivering substantially all of the rotational output from engine ENG and first electric machine EM1 to differential mechanism DF1, as is indicated by arrow 806. Method 800 further includes delivering a first portion of the rotational output from first differential mechanism DF1 to ground-engaging elements GE1 and GE2 on or along side SD1, as is indicated by arrows 808.

FIG. 6B represents a method of powering the ground-engaging elements on or along only one side of a vehicle, such as side SD1, for example. Such a mode of operation may be useful when the vehicle is primarily supported by only two wheels, such as when the vehicle is stranded on a rock or other ground feature, for example. As such, no rotational output is shown being delivered to second differential DF2 or ground-engaging elements GE3 and GE4 corresponding thereto. As such, no rotational output is being delivered to third electric motor EM3 from the second differential.

Method 800 also includes, however, delivering a portion of the rotational output from first differential mechanism DF1 to second electric machine EM2, as indicated by arrow 810. Method 800 also includes generating electrical energy using second electric machine EM2 from at least a portion of the rotational output delivered thereto and transmitting the electrical energy to suitable power electronics PE, as indicated by dashed arrow 812. Method 800 also includes selectively delivering electrical power to first electric machine EM1 from power electronics PE, as indicated by arrow 814.

Method 800 can also optionally include operatively interconnecting second and third electric machines EM2 and EM3, such as by engaging clutch 540 of differential shaft 534, for example. As a result of this interconnection, rotational motion can be transmitted from second electric machine EM2 to third electric machine as indicated by directional arrows AR6. Accordingly, additional rotational output from first differential mechanism DF1 can be reacted or otherwise transmitted to third electric machine EM3 via second electric machine EM2, as indicated by arrow 816. As such, method 800 can also optionally include generating electrical power using third electric machine EM3 and transmitting the electrical power to power electronics PE, as indicated by arrow 818. This additional electrical power can also be transmitted to first electric machine EM1, as indicated by arrow 814, such as for increasing the rotational output being generated thereby, for example.

Figure 7:
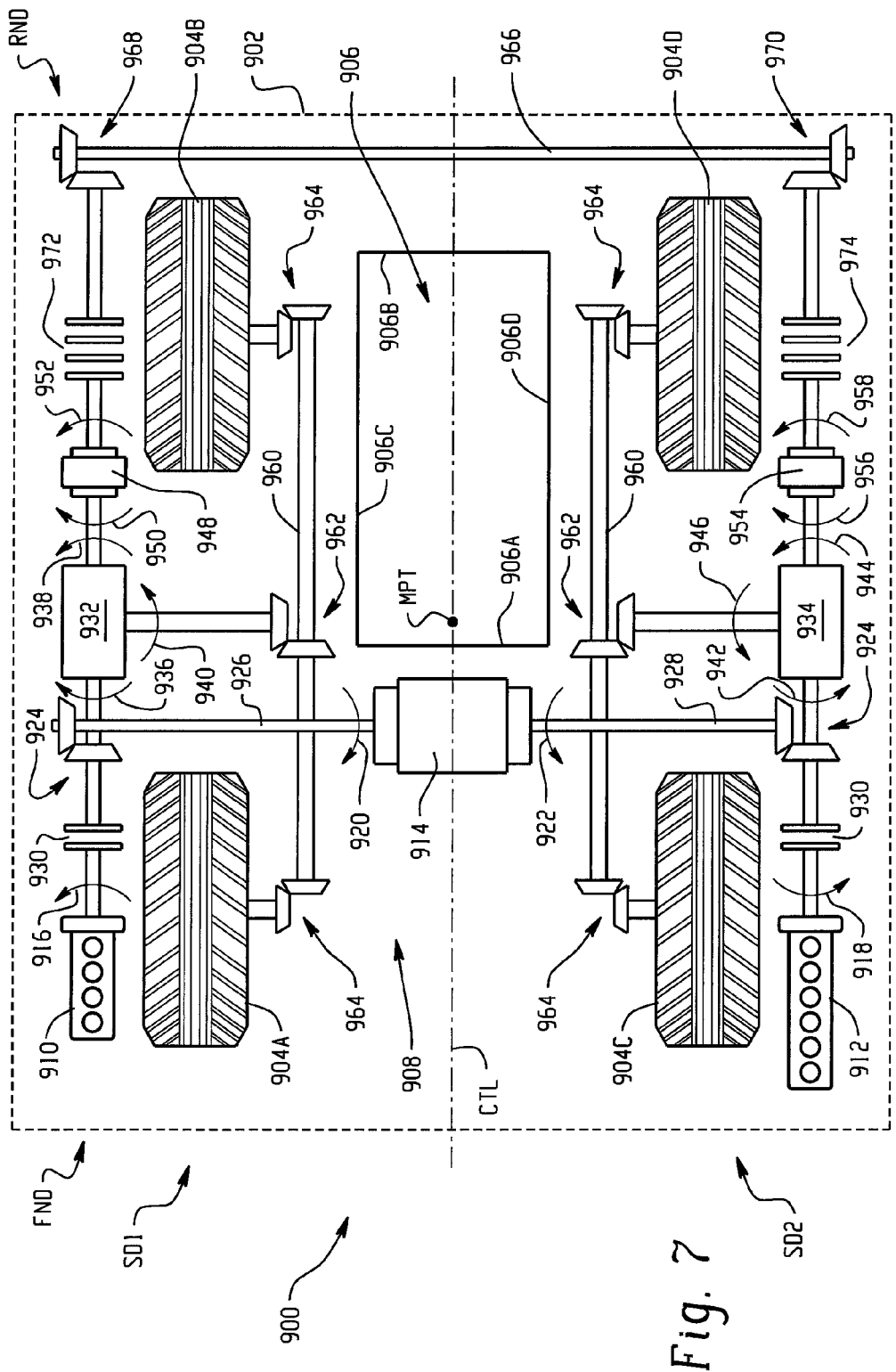
FIG. 7 is a schematic representation of a further exemplary embodiment of a powertrain in accordance with the present novel concept shown operatively disposed on a vehicle.

With reference to FIG. 7, a vehicle 900 includes a vehicle structural assembly 902 with a first plurality of ground-engaging elements, such as wheels 904A and 904B, for example, disposed along first side SD1 and a second plurality of ground-engaging elements, such as wheels 904C and 904D, for example, disposed along second side SD2. Vehicle 900 also includes a powertrain 906 that is supported on vehicle structural assembly 902 and is operatively connected to drivably engage the first and second pluralities of ground-engaging elements (e.g., wheels 904A-D). As shown in FIG. 7, vehicle structural assembly 902 includes a personnel or operator compartment 906 that is disposed within or at least partially enclosed by the vehicle structural assembly. It will be appreciated that personnel compartment 906 can be of any suitable shape, size and/or configuration as may be useful for receiving a vehicle operator and, optionally, one or more additional personnel and/or cargo. As shown in the present exemplary embodiment, compartment 906 can include opposing front and rear walls 906A and 906B, respectively, as well as opposing side walls 906C and 906D.

Powertrain 908 includes a first engine 910 that is supported on structural assembly 902 along side SD1 thereof, and can be of any suitable type, kind, size and/or configuration. Powertrain 908 also includes a second engine 912 that is supported on structural assembly 902 along side SD2 thereof, and can also be of any suitable type, kind, size and/or configuration. It will be appreciated that first and second engines 910 and 912 can be of the same or different sizes and/or configurations, without limitation. For example, first engine 910 is shown in FIG. 9 as being a four cylinder engine whereas second engine 912 is shown as being a six cylinder engine.

Powertrain 908 also includes a first electric machine 914 that is operatively connected between first and second engines 910 and 912. It will be appreciated that the first electric machine can be operatively connected between the first and second engines in any suitable manner. For example, in the embodiment shown in FIG. 7, first and second engines 910 and 912 respectively include rotational connections 916 and 918. Additionally, first electric machine includes opposing rotational connections 920 and 922. A transmission 924 is operatively connected along each of rotational connections 916 and 918, and transmission shafts 926 and 928 are operatively connected between the transmissions and respective ones of rotational connections 920 and 922. Furthermore, powertrain 908 can also include one or more clutches 930 disposed between the first and second engines and the first electric machine. Such clutches can be provided in any suitable manner to operatively disconnect the first engine from the first electric machine and the second engine from the first electric machine.

Powertrain 908 also includes a first differential 932 that is supported along side SD1 of the vehicle and a second differential 934 that is supported along side SD2 of the vehicle. First and second differentials 932 and 934 are each shown as being operatively connected to first engine 908, second engine 910 and first electric machine 912 by way of transmissions 924. As such, a portion of the total combined rotational output from the engines and first electric machine can be transmitted to one or both of the differentials.

First differential 932 includes three rotational connections, which are indicated in FIG. 7 by reference characters 936, 938 and 940. Similarly, second differential 934 includes three rotational connections, which are indicated in FIG. 7 by reference characters 942, 944 and 946. Rotational connections 936 and 942 are operatively connected to the engines and the first electric machine, as discussed above. Powertrain 908 also includes a second electric machine 948 that has two rotational connections, which are indicated by reference numbers 950 and 952. Powertrain 908 also includes a third electric machine 954 that also has two rotational connections, which are indicated by reference numbers 956 and 958. Rotational connections 938 and 952 respectively of first differential 932 and second electric machine 948 are operatively connected to one another. Additionally, rotational connections 944 and 956 respectively of second differential 934 and third electric machine 954 are operatively connected to one another. Rotational connections 940 and 946 respectively of first and second differentials 932 and 934 are operatively connected to drivably engage one or more of the plurality of ground-engaging elements on each of the respective sides of the vehicle, as discussed above with regard to other embodiments. In one exemplary arrangement, transmission shafts 960, intermediate transmissions 962 and final transmissions 964 can be used, such as has been discussed above in detail.

As discussed above with regard to powertrain 506 in FIG. 5, for example, second and third electric machines 948 and 954 are capable of being mechanically interconnected to provide different modes of operation and/or performance characteristics. It will be appreciated that the second and third electric machines can be selectively mechanically interconnected in any suitable manner. In the exemplary embodiment shown in FIG. 7, powertrain 908 includes a differential shaft 966 that operatively interconnects rotational connections 952 and 958 of second and third electric machines 948 and 954, respectively. Again, it will be appreciated that such interconnections can be of any suitable type, kind and/or configuration. For example, transmissions 968 and 970 can be included between the differential shaft and the second rotational connections of the second and third electric machines, respectively. Additionally, clutches 972 and 974 (or other suitable devices) can be provided between the respective transmissions and rotational connections of the second and third electric machines.

It will be appreciated that powertrain 908 is similar to powertrain 506 discussed in detail above and can operate substantially similar thereto. One difference between powertrain 908 and powertrain 506 is that the components of powertrain 908 are disposed outwardly around personnel compartment 906. Thus, the components of the powertrain are thereby capable of providing additional protection and/or shielding along two or more of walls 906A-D of the personnel compartment. Another difference is that a second engine is provided in powertrain 908. As such, the vehicle has improved capability to withstand damage to one side of the vehicle and still remain drivable, such as while using only about half of the powertrain components (e.g., those components disposed along the undamaged side of the vehicle). Still a further difference is that clutch 540 in powertrain 506 can experience differential shaft portions rotating at full speed in different directions, whereas clutches 972 and 974 may experience about half of the speed due to the position thereof along the operative connection.

Figure 8:
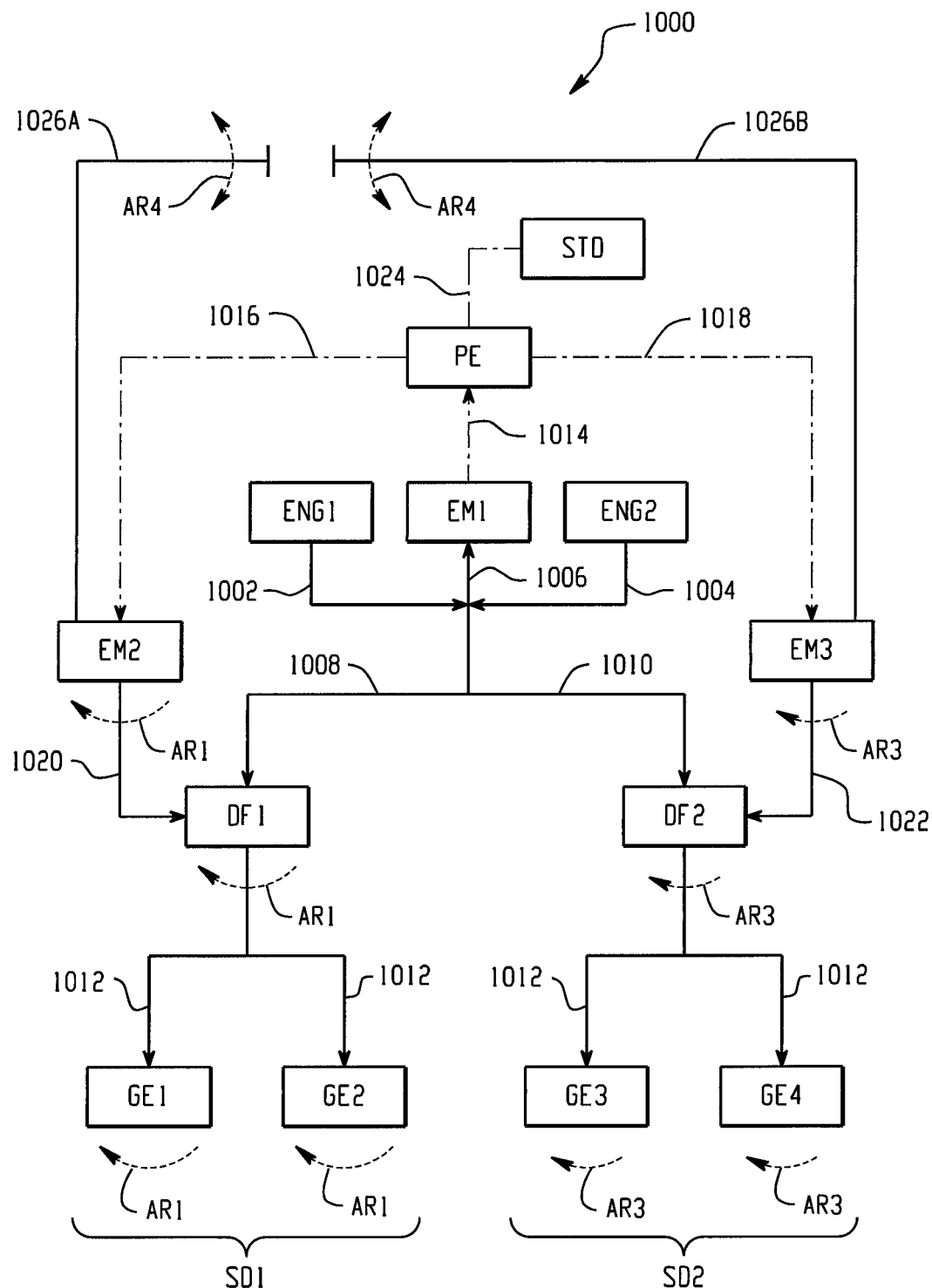
FIG. 8 illustrates yet a further exemplary method of powering a vehicle in accordance with the present novel concept.

Still another exemplary method 1000 of powering a vehicle using a powertrain in accordance with the present novel concept, such as powertrain 908, for example, is shown in FIG. 8. Method 1000 includes generating rotational output using at least one of first engine ENG1, as indicated by arrow 1002, and second engine ENG2, as indicated by arrow 1004. Method 1000 also includes transmitting a first portion of the rotational output to first electric machine EM1, as indicated by arrow 1006. The method also includes transmitting a second portion of the rotational output to differential mechanisms DF1 and DF2, as is respectively indicated by arrows 1008 and 1010. Method 1000 further includes transmitting rotational output from first differential mechanism DF1 and second differential mechanism DF2 to the respective ground-engaging elements, as indicated by arrows 1012.

Method 1000 further includes generating electrical power using the rotational output transmitted from along arrow 1006 to first electric machine EM1 and transmitting the electrical power to suitable power electronics PE, as indicated by dashed arrow 1014. Method 1000 also includes selectively transmitting electrical power from power electronics PE to second and/or third electric machines EM2 and/or EM3, as indicated by dashed arrows 1016 and 1018, respectively. Method 1000 further includes transmitting rotational output from second and third electric machines EM2 and EM3 respectively to first and second differential mechanisms DF1 and DF2, as indicated by arrows 1020 and 1022. This additional rotational output is transmitted to the ground-engaging elements disposed along sides SD1 and SD2 of the vehicle. Furthermore, method 1000 can optionally include selectively transferring electrical energy to and/or from storage device STD, as indicated by dashed arrow 1024.

Method 1000 in FIG. 8 illustrates operation of a vehicle in a mode that is well suited for relatively high speed travel. At such relatively high speeds, the rotational output of the second and third electric motors is utilized, such as to maintain higher angular velocities of the powertrain components, for example. During such operation, the second and third electric machines are operatively disconnected from one another, as indicated by arrows 1026A and 1026B, such that first and second electric machines EM2 and EM3 can rotate independently of one another, as indicated by directional arrows AR4. This provides a mechanical differential action such that sides SD1 and SD2 of the vehicle can operate at different speeds, as indicated by directional arrows AR1 and AR3.

Figure 8A:
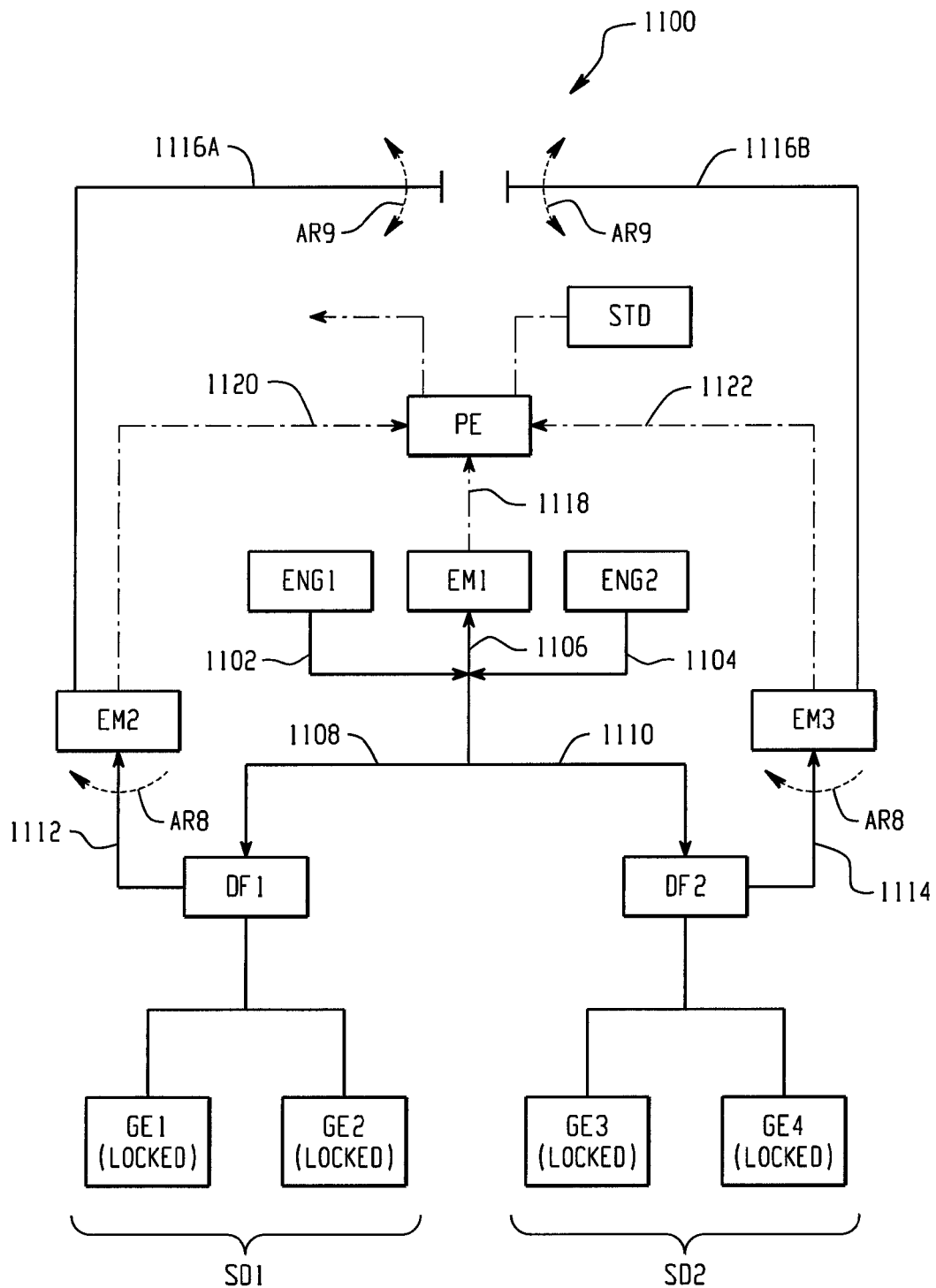
FIG. 8A illustrates a method of generating electrical power using a vehicle that includes a powertrain in accordance with the present novel concept.

With reference to FIG. 8A, one exemplary method 1100 of generating electrical power using a vehicle that includes a powertrain in accordance with the present novel concept, such as powertrain 908, for example, includes generating rotational output using at least one of first and second engines ENG1 and ENG2, as is respectively indicated by arrows 1102 and 1104. Method 1100 also includes transmitting a first portion of the rotational output to first electric machine EM1, as indicated by arrow 1106. The method also includes transmitting a second portion of the rotational output to differential mechanisms DF1 and DF2, as is respectively indicated by arrows 1108 and 1110. Method 1100 differs from other previously discussed methods in that rather than delivering rotational output to the ground-engaging elements, method 1100 includes transmitting rotational output from first differential mechanism DF1 and second differential mechanism DF2 to second and third electric machines EM2 and EM3, respectively, as indicated by arrows 1112 and 1114. In this case, the ground-engaging elements are in a locked or otherwise non-rotatable condition, which causes substantially all of the rotational output from the differential mechanisms to be delivered to the second and third electric machines, as indicated by directional arrows ARB.

As indicated by arrows 1116A and 1116B, second and third electric machines EM2 and EM3 are operatively disconnected from one another. As such, the second and third electric machines can rotate independently from one another, as indicated by directional arrows AR9. Method 1100 further includes generating electrical power using the rotational output transmitted from along arrow 1106 to first electric machine EM1 and transmitting the electrical power to suitable power electronics PE, as indicated by dashed arrow 1118. Additionally, method 1100 includes generating electrical power using the rotational output transmitted from along arrows 1112 and 1114 to second and third electric machines EM2 and EM3, and transmitting the electrical power to suitable power electronics PE, as indicated by dashed arrows 1120 and 1122, respectively. Method 1100 further includes delivering electrical power from power electronics PE to an external power connection for supplying electrical power thereto, as indicated by arrow 1124.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject disclosure. Obviously, modifications and alterations will occur to others upon reading and understanding the preceding detailed description. Accordingly, it is to be distinctly understood that the foregoing descriptive matter is to be interpreted merely as illustrative of the present novel concepts and not as a limitation. As such, it is intended that the subject novel concepts be construed as including all such modifications and alterations insofar as they come within the scope of the appended claims and any equivalents thereof.

The invention claimed is:

1. A method of powering a vehicle, said method comprising:
   a) providing a vehicle structural assembly including a longitudinally-extending centerline and opposing vehicle structure sides;
   b) providing first and second pluralities of ground-engaging elements with said first plurality of ground-engaging elements disposed along one of said opposing vehicle structure sides and said second plurality of ground-engaging elements disposed along the other of said opposing vehicle structure sides;
   c) providing a vehicle powertrain including a first engine, a first electric machine, a second electric machine, a third electric machine, a first differential and a second differential;
   d) transmitting rotational output from at least said first engine to said first and second differentials;
   e) transmitting rotational output from at least one of said first electric machine and said second electric machine to said first differential and transmitting rotational output from at least one of said first electric machine and said third electric machine to said second differential; and,
   f) transmitting rotational output from said first differential to said first plurality of ground-engaging elements to operatively drive said one of said opposing vehicle structure sides and transmitting rotational output from said second differential to said second plurality of ground-engaging elements to operatively drive said other of said opposing vehicle structure sides.

2. A method according to claim 1, wherein providing said vehicle structural assembly in a) includes providing a vehicle structural assembly that includes a personnel compartment, and providing said vehicle powertrain in c) includes positioning one or more of said first engine, said first electric machine, said second electric machine, said third electric machine, said first differential and said second differential outwardly along said personnel compartment for providing supplemental protection to said personnel compartment.

3. A method according to claim 1, wherein transmitting rotational output in e) includes transmitting rotational output from said engine to said first electric machine and thereby generating electrical power at said first electric machine, transmitting at least a portion of said electrical power from said first electric machine to at least one of said second and third electric machines, and transmitting rotational output from said second electric machine to said first differential and transmitting rotational output from said third electric machine to said second differential.

4. A method according to claim 1, wherein transmitting rotational output in e) includes transmitting rotational output from said first differential to said second electric machine and from said second differential to said third electric machine and thereby generating electrical power at said second and third electric machines, transmitting at least a portion of said electrical power from at least one of said second and third electric machines to said first electric machine, and transmitting rotational output from said engine and said first electric machine to said first and second differentials.

5. A method according to claim 2 further comprising rotationally affixing said second and third electric machines relative to one another, disengaging said first electric machine from said first engine and transmitting rotational output from said engine to said first and second pluralities of ground-engaging elements through said first and second differentials to operatively drive the vehicle without electrically powering at least one of said first, second and third electric machines.

6. A method according to claim 2, wherein providing said vehicle powertrain in c) includes providing a second engine and transmitting rotational output in d) includes selectively transmitting rotational output from at least one of said first and second engines to said first and second differentials.

7. A method of generating electrical power from a vehicle, said method comprising:
   a) providing a vehicle structural assembly including a longitudinally-extending centerline and opposing vehicle structure sides;
   b) providing first and second pluralities of ground-engaging elements with said first plurality of ground-engaging elements disposed along one of said opposing vehicle structure sides and said second plurality of ground-engaging elements disposed along the other of said opposing vehicle structure sides;
   c) providing a vehicle powertrain including a first engine, a first electric machine, a second electric machine, a third electric machine, a first differential and a second differential;
   d) rotationally affixing said first and second pluralities of ground-engaging members such that rotational output from said first and second differentials can be respectively transmitted to said second and third electric machines;
   e) transmitting rotational output from at least said first engine to at least one of said first electric machine, said first differential and said second differential; and,
   f) generating electrical power at said at least one of said first, second and third electric machines in response to said rotational output from said first engine.

* * * * *